(12) United States Patent
Siracki et al.

(10) Patent No.: US 7,721,937 B2
(45) Date of Patent: May 25, 2010

(54) WELD METAL MATERIAL APPARATUS AND METHOD

(75) Inventors: Glenn T. Siracki, Mantua, OH (US); John J. Gregel, Bedford, OH (US); Dale R. Boling, Avon, OH (US); Frank J. Fitzgerald, Cary, NC (US); George F. Kub, Jr., Twinsburg, OH (US); Andrew W. Weisel, Chagrin Falls, OH (US); Johannes L. L. A. van den Broek, Tilburg (NL); Timothy P. Sepelak, Willoughby, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 12/420,182

(22) Filed: Apr. 8, 2009

(65) Prior Publication Data

US 2009/0188969 A1    Jul. 30, 2009

Related U.S. Application Data

(62) Division of application No. 11/188,494, filed on Jul. 25, 2005.

(51) Int. Cl.
*B23K 31/02* (2006.01)
(52) U.S. Cl. .................. 228/107; 228/108; 228/2.5; 228/234.3; 266/167
(58) Field of Classification Search ............... 228/107, 228/108, 2.5, 234.3; 266/167
See application file for complete search history.

(56) References Cited

U.S. PATENT DOCUMENTS 2,424,937 A   7/1947   Linzell
2,927,990 A   3/1960   Johnson
3,025,153 A   3/1962   Cross (Continued)

FOREIGN PATENT DOCUMENTS

EP   411380   2/1991

(Continued)

OTHER PUBLICATIONS

International Search Report and Written Opinion from corresponding International Application No. PCT/US06/28776.

*Primary Examiner*—Jessica L. Ward
*Assistant Examiner*—Erin B Saad
(74) *Attorney, Agent, or Firm*—Renner, Otto, Boisselle & Sklar, LLP (57) ABSTRACT

A solid weld-metal-producing material is formed by agglomerating weld metal material powder. An igniter may be integrally formed in or on the agglomerated weld metal material. In addition to typical components of a weld metal material mixture, such as a reductant metal and a transition metal oxide, the agglomerated weld metal mixture may include a binder material, such as sodium silicate. In addition to functioning as a binder to help hold the agglomerated weld metal material together, the binder material may aid in the exothermic reaction that occurs when the weld metal material is ignited. The agglomerated weld metal material may be made by mixing together a reductant metal powder, a transition metal oxide powder, and possibly a binder solution. A slurry of the components may be pressed together, for example, using a die and a ram, and then may be dried.

20 Claims, 5 Drawing Sheets

U.S. PATENT DOCUMENTS

| | | |
|---|---|---|
| 3,198,640 A | 8/1965 | Walsh |
| 3,234,603 A * | 2/1966 | Leuthy et al. ............... 164/108 |
| 3,344,210 A | 9/1967 | Silvia et al. |
| 3,529,996 A | 9/1970 | David et al. |
| 3,713,852 A | 1/1973 | Wiley |
| 3,726,727 A | 4/1973 | Ishibashi |
| 3,874,365 A | 4/1975 | Pava |
| 4,214,144 A | 7/1980 | Spielgelberg |
| 4,241,285 A | 12/1980 | Golonka, Sr. et al. |
| 4,617,445 A | 10/1986 | Shaw et al. |
| 4,658,886 A | 4/1987 | Carlson |
| 4,804,811 A | 2/1989 | Raycher et al. |
| 4,879,452 A | 11/1989 | Kovarik et al. |
| 4,881,677 A | 11/1989 | Amos et al. |
| 4,885,452 A | 12/1989 | Amos et al. |
| 4,889,324 A | 12/1989 | Brosnan et al. |
| 5,062,903 A | 11/1991 | Brosnan et al. |
| 5,070,226 A | 12/1991 | Raycher et al. |
| 5,145,106 A * | 9/1992 | Moore et al. ............ 228/234.3 |
| 5,171,378 A | 12/1992 | Kovarik et al. |
| 5,490,888 A * | 2/1996 | Assel et al. .................... 149/37 |
| 5,533,662 A | 7/1996 | Stidham et al. |
| 5,582,228 A | 12/1996 | Stidham et al. |
| 5,660,317 A | 8/1997 | Singer et al. |
| 5,715,886 A | 2/1998 | Fuchs |
| 5,829,510 A | 11/1998 | Fuchs |
| 5,954,261 A | 9/1999 | Gaman |
| 6,316,125 B1 | 11/2001 | Gaman et al. |
| 6,553,911 B1 | 4/2003 | Walker et al. |
| 6,789,724 B2 | 9/2004 | Cordier et al. |
| 6,835,910 B2 | 12/2004 | Moore et al. |
| 6,972,059 B1 | 12/2005 | Skerdi |
| 2004/0048058 A1 | 3/2004 | Moore et al. |
| 2004/0164438 A1 | 8/2004 | Lamport |
| 2004/0222274 A1 | 11/2004 | Harger et al. |

FOREIGN PATENT DOCUMENTS

| | | |
|---|---|---|
| GB | 1109856 | 4/1968 |

* cited by examiner

WELD METAL MATERIAL APPARATUS AND METHOD

This application is a division of U.S. patent application Ser. No. 11/188,494, filed Jul. 25, 2005, which is incorporated herein in its entirety.

BACKGROUND OF THE INVENTION

1. Field of the Invention

This invention relates generally to welding apparatus and methods, and more particularly to apparatus and methods for forming weld connections, and for initiating self-propagating exothermic reactions, such as in the process of forming the weld connections.

2. Description of the Related Art

Exothermic welding has become recognized as a preferred way to form top quality high ampacity, low resistance electrical connections.

Exothermic welded connections are immune to thermal conditions which can cause mechanical and compression joints to become loose or corrode. They are recognized for their durability and longevity. The process fuses together the parts or conductors to provide a molecular bond, with a current carrying capacity equal to that of the conductor. Such connections are widely used in grounding systems enabling the system to operate as a continuous conductor with lower resistivity.

Examples of self propagating exothermic reactions for exothermic welding are found in the CADWELD process and the THERMIT process. CADWELD is a trademark of ERICO International Corporation, Solon, Ohio, U.S.A., and Thermit is a trademark of Th. Goldschmidt A G, Essex, Germany. Exothermic welding mixtures are basically a combination of a reductant metal and usually a transition metal oxide. An example is aluminum and copper oxide, which upon ignition supply enough heat to propagate and sustain a reaction within the mixture. It is usually the molten metal product or the heat of this reaction, which is then used to produce a desired result. The CADWELD process produces, for example, a mixture of molten copper and aluminum oxide or slag. The higher density of the molten copper causes separation from the slag, with the molten copper usually directed by a mold to join or weld copper to copper, copper to steel, or steel to steel. The aluminum oxide slag is removed from the weld connection and discarded. Another common mixture is iron oxide and aluminum. Where only the heat of the reaction is used, the heat may be used to fuse brazing material, for example.

Figure 1:
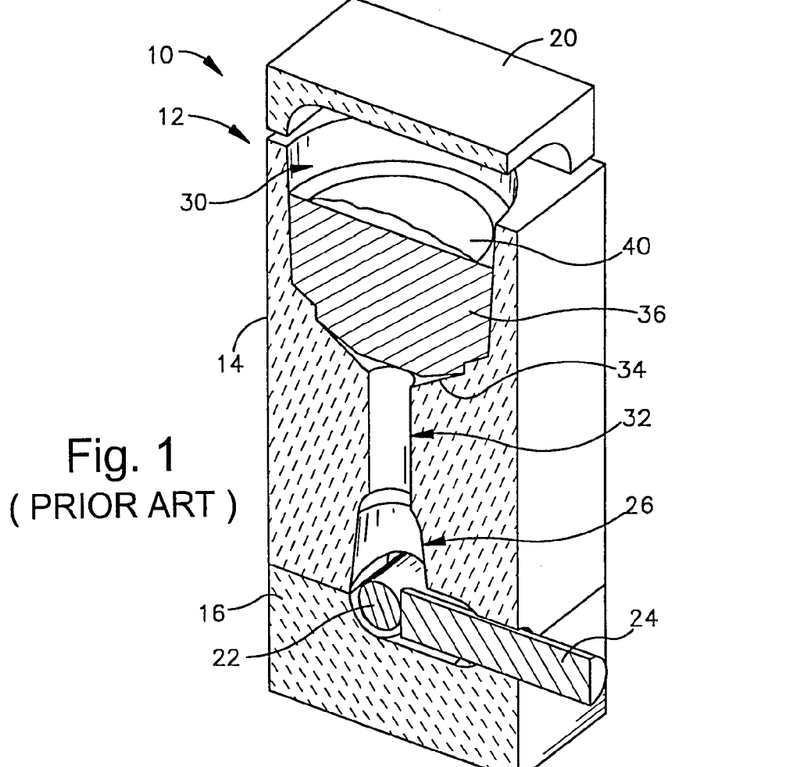
FIG. 1 is a cutaway isometric illustration of a prior art welding apparatus.

The exothermic reaction produces a large amount of heat. The most common way to contain the reaction, and to produce the weld or joint, has been to contain the reaction in a split graphite mold. A prior art welding apparatus 10 utilizing such a split graphite mold 12 is shown in FIG. 1. Referring to FIG. 1, the mold 12 includes an upper mold body section 14, a lower mold body section 16, and a mold cover 20. The conductors or items to be joined, such as the bars 22 and 24, are thoroughly cleaned and then placed in the appropriate location to project into a weld chamber 26 defined by the body sections 14 and 16 of the mold 12. The upper mold body section 14 includes a crucible chamber 30 above the weld chamber 26, connected to the weld chamber 26 by a tap hole 32. The mold body sections 14 and 16 are then securely closed and locked usually with a toggle clamp, and a metal disk 34 is positioned in the crucible chamber 30 over a tap hole 32. An appropriate amount of powdered exothermic material 36 is emptied into the crucible chamber 30 on top of the disk 34, and a traditional starting powder or material 40 is sprinkled over the top of the exothermic welding material 36. The starting powder 40 is essentially a much finer exothermic material. The mold cover 20 is then closed and the reaction initiated by igniting the starting powder 40 by the use of a flint igniter.

The starting powder or material 40 sprinkled on top of the exothermic material 36 has a lower ignition temperature and is easily ignited by the flint gun while the flint gun cannot normally ignite the exothermic material 36 directly. The exothermic reaction of starting powder 40 subsequently ignites the exothermic material 36. When the exothermic material 36 is ignited, the molten metal phase separates from the slag and melts through the metal disk 34. The molten metal then is directed via the tap hole 32 to the weld chamber 26 and the conductors 22 and 24 to be joined. Once the metal has solidified, the mold body sections 14 and 16 are opened and the slag is separated from the weld connection. The mold 12 may then be cleaned and readied for reuse for the next connection.

As suggested by the above, exothermic mixtures of this type do not react spontaneously and need a method of initiating the reaction. This initiation method involves generating enough localized energy to enable the reaction to begin. One method of initiating reaction is that described above, use of a starting powder and an ignition source such as a flint igniter. However, because of the starting powder's low ignition temperature and difficulties in handling and shipping, much effort has been made to find a reliable and low cost alternative ignition system for the exothermic material. A number of electrical systems have been devised which range from simple spark gaps to bridge wires or foils, to much more esoteric devices such as rocket igniters. Such efforts are seen, for example, in prior U.S. Pat. Nos. 4,881,677, 4,879,452, 4,885,452, 4,889,324 and 5,145,106. For a variety of reasons, but primarily because of power requirements, dependability, and cost, such devices have not succeeded in replacing the standard starting powder/flint gun form of initiating the self-propagating exothermic reactions. Another electrical ignition system is the system disclosed in U.S. Pat. No. 6,553,911, owned by the assignee of this application, which is incorporated herein by reference in its entirety.

In addition, there are other difficulties inherent with the welding apparatus and method described above. Aside from the difficulties in handling and shipping the starting powder 40, there may be problems in handling and shipping the bulk exothermic material 36 itself. Properly measuring the exothermic material 36 may be both time consuming and susceptible to error. Further, the graphite molds utilized in prior art apparatuses, such as the mold 12 utilized in the welding apparatus 10 shown in FIG. 1, may be costly because of the amount of graphite involved, and because of the amount of machining need to produce the passages shown in the mold 12 of FIG. 1. Finally, a process such as that described above produces undesirable residues on surfaces of the mold 12. The residues require periodic cleaning of the surfaces of the mold 12, a labor-intensive process. Even with periodic cleaning, the formation of the residues may reduce the operational life of the mold 12. Finally, the cleaning itself may cause damage to the mold, also leading to reduced operation life of the mold 12.

Figure 2:
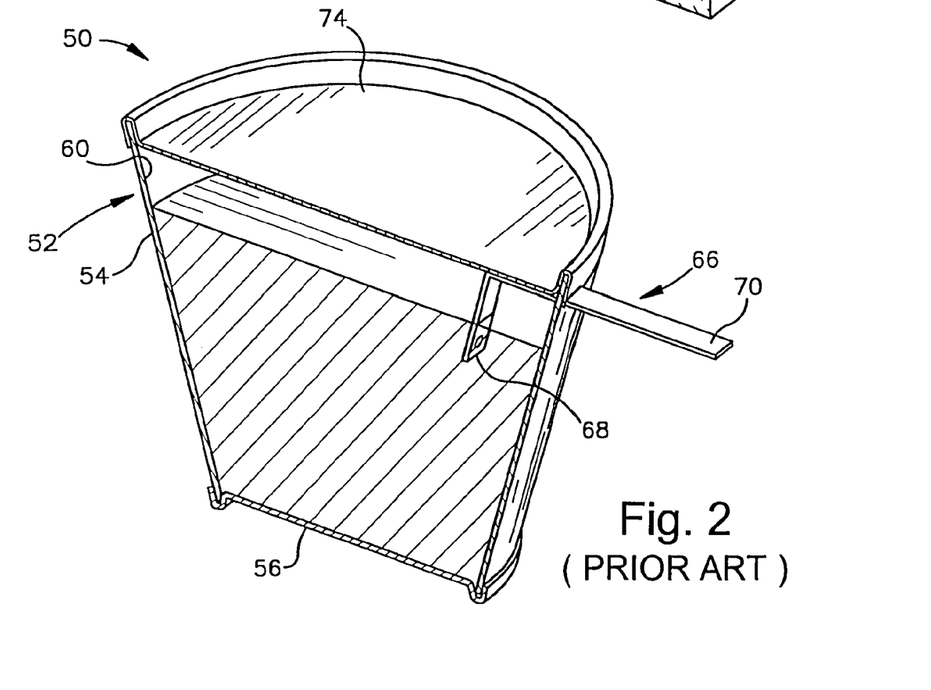
FIG. 2 is a cutaway isometric illustration of another prior art welding apparatus.

One alternative prior art device for containing weld material is a sealed crucible assembly 50, shown in FIG. 2. The crucible assembly 50 includes a container 52 having sidewalls 54 and a fusible bottom 56. A refractory material 60 lines the sidewalls 54 of the container 52. A pre-measured amount of weld material 64 is in the container 52. An igniter 66 has a first end 68 situated above or partially within the weld material 64, and a second end 70 protruding from the container 52. The second end 70 may be coupled to a voltage supply to produce a voltage sufficient to cause a plasma or spark at the first end 68. The plasma or spark from the igniter 66 ignites the weld material 64, causing the same type of exothermic chemical reaction as described above. A cover 74 may be placed over the top of the container 52, to maintain weld material 64 within, and/or to prevent ingress of dirt, moisture, or other undesirable substances. The crucible assembly 50 may be used in place of the metal disk 34 (FIG. 1), the exothermic material 36 (FIG. 1), and the starting powder 40 (FIG. 1), in a graphite mold similar to the mold 12 (FIG. 1), to make a weld connection. A device such as shown in FIG. 2 is sold by ERICO International Corporation under the trademark CADWELD PLUS. Further details of such a device are given in U.S. Pat. No. 6,835,910, the drawings and detailed description of which are herein incorporated by reference.

Accordingly, it will be appreciated that improved welding apparatus and methods would be desirable.

SUMMARY OF THE INVENTION

According to an aspect of the invention, a weld-metal-producing material is in the form of a solid agglomeration. The agglomeration may include a metallic compound, a reducing agent, and a mechanical binder. When ignited, the agglomeration undergoes a self-propagating exothermic chemical reaction that produces a flowable molten weld metal. The agglomeration may be produced from a slurry that includes a liquid, such as water, and powdered materials. The slurry may be pressed and dried to produce the agglomeration. The agglomeration may have a reduced volume relative to powdered materials used to produce a corresponding amount of molten weld metal.

According to another aspect of the invention, a device for producing molten weld metal material, the device includes a solid agglomeration capable of producing flowable weld metal material. The agglomeration includes a metallic compound and a reducing agent.

According to yet another aspect of the invention, a method of coupling together two or more conductors includes the steps of: placing respective parts of the conductors in a weld chamber of a mold; placing an agglomeration of weld-metal-producing material in a crucible of the mold; igniting the agglomeration to produce molten weld metal material in the crucible; and flowing the molten weld metal material into the weld chamber to thereby couple together the conductors.

According to a still further aspect of the invention, a method of fabricating a device for producing molten weld metal material includes the steps of: forming a slurry that includes a metallic compound powder, a reductant metal powder, a binder material, and a liquid; pressing the slurry to remove some of the liquid from the slurry, and to reduce the volume of the slurry creating more intimate particle to particle contact; and drying the pressed slurry to produce an agglomeration of weld-metal-producing material.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A solid weld-metal-producing material is formed by agglomerating weld metal material powder. An igniter may be integrally formed in or on the agglomerated weld metal material. In addition to typical components of a weld metal material mixture, such as a reductant metal and a transition metal oxide, the agglomerated weld metal mixture may include a binder material, such as sodium silicate. In addition to functioning as a binder to help hold the agglomerated weld metal material together, the sodium silicate or other binder material may aid in the exothermic reaction that occurs when the weld metal material is ignited. The agglomerated weld metal material may be made by mixing together a reductant metal powder, a transition metal oxide powder, and possibly a binder solution that includes a binder and a liquid, such as water. The dry powders or a slurry of the components may be pressed together, for example, using a die and a ram, and then may be dried by a suitable method, such as heating or vacuum drying. The agglomerated weld metal material offers several potential advantages over prior weld-metal-producing apparatuses and methods. Among these potential advantages are a reduced amount of packaging and weight, and elimination of certain components, such as a metal disk to keep powdered weld metal material in a crucible chamber prior to starting the reaction.

Figures 3, 4, 5:
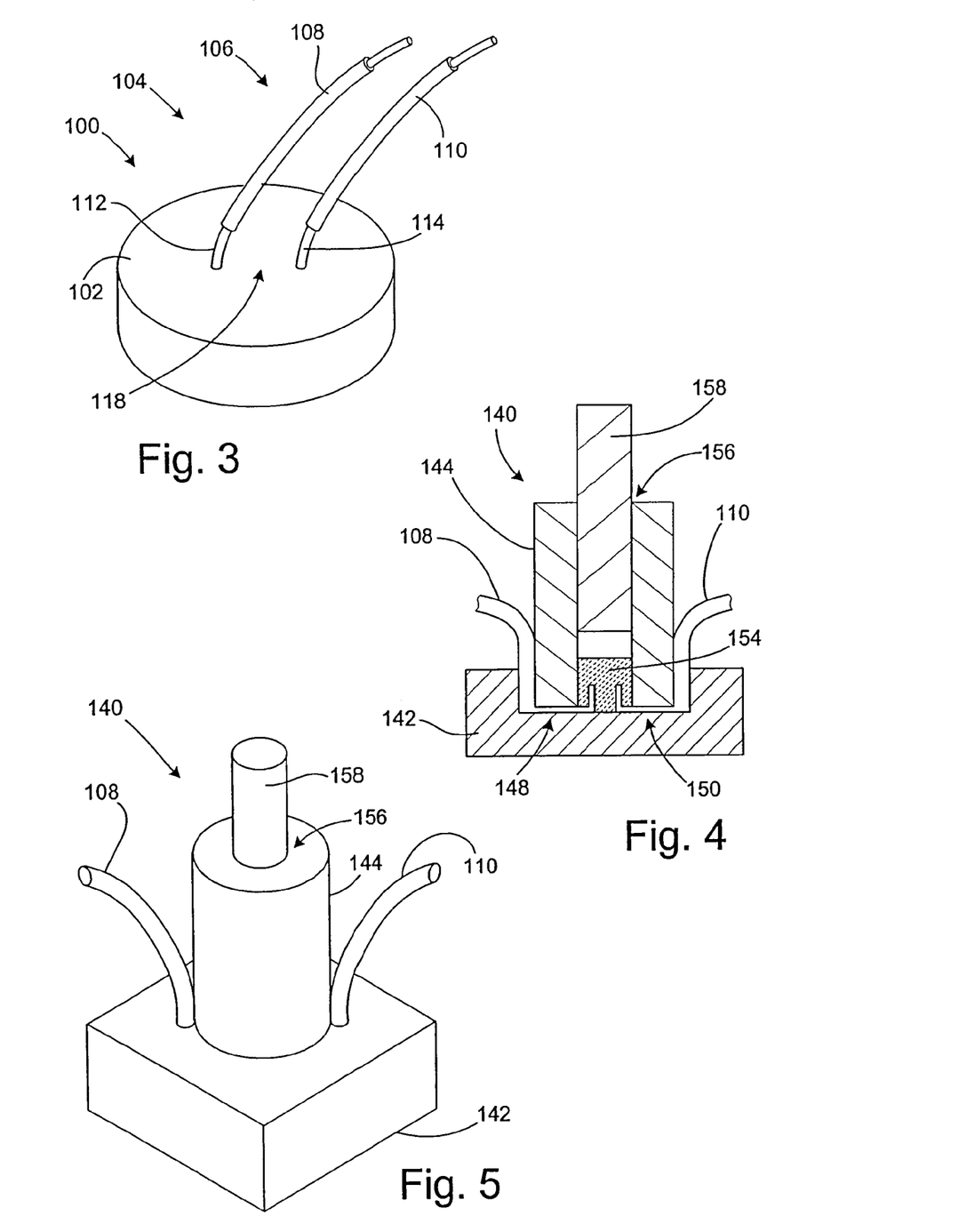
FIG. 3 is an oblique view of a weld-metal-producing device in accordance with the present invention.
FIG. 4 is a sectional view of a press used to produce the weld metal device of FIG. 3.
FIG. 5 is an oblique view of the press of FIG. 4.

FIG. 3 shows a weld metal device 100. The device 100 includes an agglomeration 102 of weld-metal-producing material, and an igniter 104 that is coupled to the agglomeration 102. The specific embodiment of the igniter 104 shown in FIG. 3 is a variety of electrical igniter 106. The electrical igniter 106 has a pair of wires 108 and 110. Non-insulated portions 112 and 114 of the wires 108 and 110 are inserted into the agglomeration 102, with a spark gap 118 between the portions 112 and 114. When a sufficiently large voltage difference is applied across the wires 108 and 110, a spark is created across the gap 118, which ignites the weld metal agglomeration 102.

The agglomeration 102 is a pressed-together mixture of particles of weld-metal-producing material. The mixture may include a metallic compound powder and a reducing agent. The metallic compound powder may include a metal oxide or a metal sulfate. Suitable metal oxides include transition metal oxides, such as iron oxide (magnetite ($Fe_3O_4$), hematite ($Fe_2O_3$), and/or FeO), copper oxide (cupric oxide (CuO) and/or cuprous oxide ($Cu_2O$)), manganese dioxide ($MnO_2$), and titanium dioxide ($TiO_2$), or combinations thereof. Suitable metal sulfates include Group II metal sulfates, such as magnesium sulfate ($MgSO_4$), calcium sulfate ($CaSO_4$), or barium sulfate ($BaSO_4$), and Group I metal sulfates, such as lithium sulfate ($Li_2SO_4$), sodium sulfate ($Na_2SO_4$), or potassium sulfate ($K_2SO_4$). It will be appreciated that many other suitable metal compounds may be used.

The reducing agent may be a reductant metal powder, such as aluminum powder or copper powder, or a combination of the two.

Broadly speaking, the reaction may proceed as follows:

transition metal oxide+reductant metal ⟹ metal+ metal oxide+energy

In particular, for magnetite as the metal compound powder, and aluminum as the reducing agent, the reaction proceeds as follows:

$3Fe_3O_4 + 8Al \Longrightarrow 9Fe + 4Al_2O_3 + Heat$

The agglomeration may also have a suitable binder material that aids in holding the agglomeration 102 together. The binder material may mechanically bind together the components of the agglomeration 102. That is, the binder material may function to mechanically cause particles of the powders of the agglomeration 102 to bind together. This is in contrast to chemical binders that form chemical bonds to hold materials together. Suitable binders may include sodium silicate and potassium hydroxide. Other suitable inorganic binders may also be used.

While one purpose of the binder material is to aid in holding the agglomeration 102 together, it will be appreciated that it is important that the binder material not prevent flow of the molten metal material that results from the chemical reaction of the metal oxide and the reducing agent. In essence, the amount of the binder material added is a result of a balance between the need to hold the agglomeration 102 together in solid form prior to the initiation of the weld-metal-producing chemical reaction, and the need for the product of this chemical reaction, once initiated, to be able to flow where desired. The amount of binder material in the final solid form of the agglomeration 102 may be, for example, 0-5% by weight.

The binder material used to hold the agglomeration 102 together may be involved in and enhance the chemical reaction between the metal oxide and the reducing agent. Alternatively, the binder material may be a material that does not substantially enhance or affect the chemical reaction.

In the illustrated embodiment, the agglomeration 102 has a disk or cylinder shape. It will be appreciated, however, that the agglomeration 102 may alternatively be made in any of a wide variety of other suitable shapes.

The size of the spark gap 118 is selected so as to allow formation of a suitable spark to ignite the agglomeration 102 when a suitable voltage is applied across the wires 108 and 110. For instance, the spark gap 118 may be from nearly 0 (no gap) to about 0.75 inches (19 mm), or even larger.

FIGS. 4 and 5 illustrate a press 140 for fabricating the device 100 (FIG. 3). The press 140 includes a die base 142 onto which a die 144 is placed. The die base 142 has slots 148 and 150 for receiving the wires 108 and 110 therein, to hold them in place during the fabrication process. Alternatively, the wires 108 and 110, or other components of the igniter 104 (FIG. 3), may be placed on or joined to the agglomeration 102 (FIG. 3) after the agglomeration 102 is formed. Agglomeration material 154 is placed in an opening 156 in the die 144. As described above, the agglomeration material 154 may be a slurry that includes a metal oxide powder, a reducing agent, and a binder, all mixed in a liquid such as water. As the ram 158 is pressed down against the agglomeration material 154, the material 154 is compacted, with some of the liquid possibly being squeezed out. The compression force used to press down against the agglomeration material 154 may vary over a wide range, for instance, being between about 0 and 100,000 pounds (440,000 Newtons). The compressing may reduce the volume of the agglomeration mixture 154 relative to the volume of the powders that make up the agglomeration mixture 154. Thus, the agglomeration 102 may have a volume that is 20 to 50% less, or about 45% less, than the volume of the powders making up the unpressed agglomeration material mixture 154. Of course, it will be appreciated that the reduction in volume may be lower if less force is used to compress the powers making up the agglomeration 102.

Following the pressing of the agglomeration material 154 with the ram 158, the device 100 (FIG. 3) may be removed from the press 140. The resulting agglomeration 102 (FIG. 3) may then be dried by suitable methods, such as heating or vacuum drying, to further remove more of the liquid, and to produce a dried agglomeration of solid weld-metal-producing material capable of being ignited. The heating may involve heating the device 100 to achieve a core temperature within the agglomeration 102 of about 250° F. (121° C.).

Other methods and formulations may be used in making the agglomeration 102. An alternative formulation is a binderless formulation, wherein the agglomeration 102 is formed from a slurry that contains the metallic compound and reducing agent powders, without use of a binder. Another alternative is to a dry pressing together of the metallic compound and reducing agent powders, without use of a liquid or a binder material. In addition, a wide variety of suitable presses or other related equipment may be used to produce the device 100. For example, suitable devices such as briquetters, pellet mills, roll compactors, isostatic presses, tableting presses, and extruders may be used in producing the device 100.

Figure 6:
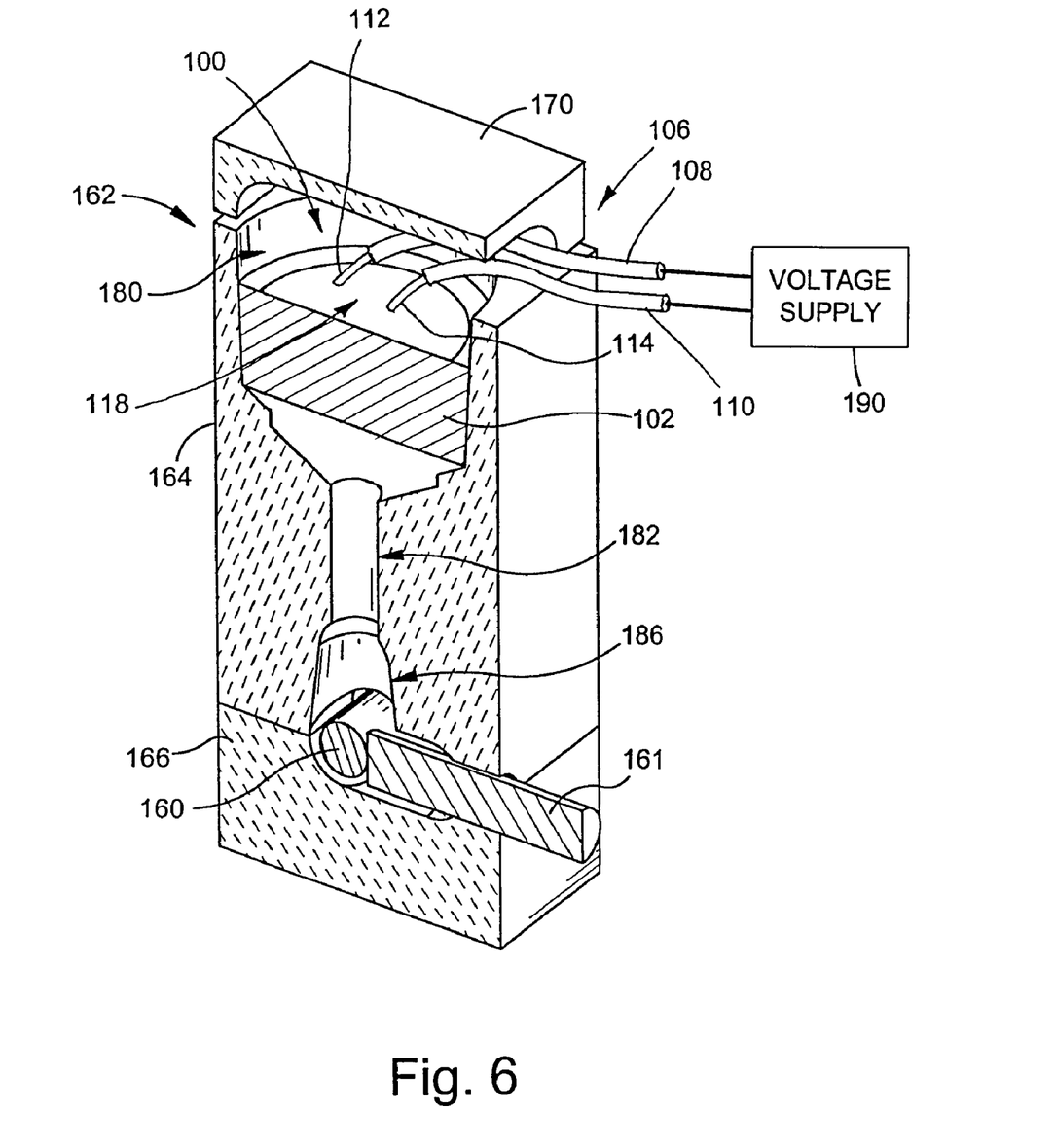
FIG. 6 is a cutaway isometric view illustrating use of the weld metal device of FIG. 3 in formation of a connection between a pair of conductors.

FIG. 6 illustrates employment of the device 100 in producing a connection between a pair of conductors 160 and 161. The device 100 is placed in a mold 162, where the device 100 is ignited and the connection is made. The mold 162 may be similar in many respects to the prior art mold 12 (FIG. 1) described above. The mold 162 may include an upper mold body section 164, a lower mold body section 166, and a mold cover 170. A weld chamber 186, into which the conductors are placed, is coupled to a crucible chamber 180 via a tap hole 182.

In use, the agglomeration 102 is placed in the crucible chamber 180, and the electrical igniter 106 is coupled to a voltage source 190. The voltage source 190 provides suitable voltage to cause a spark across the gap 118 between the non-insulated portions 112 and 114 of the wires 108 and 110 of the electrical igniter 106. This initiates the exothermic reaction in the agglomeration 102, producing molten weld metal material in the crucible chamber 180. This molten material flows through the tap hole 182 and into the weld chamber 186. In the weld chamber 186 the molten material solidifies around the conductors 160 and 161, making the welded connection between the conductors 160 and 161.

It will be appreciated that the crucible chamber 180 may be made smaller than the corresponding crucible chamber 30 (FIG. 1) of the mold 12 described above. This is because, as noted above, the compressing to form the agglomeration 102 reduces the overall volume of the agglomeration, relative to that of the volume of a powdered material for making the same size weld material connection.

It has been found in testing that use of the device 100 with the agglomerated weld metal material 102 results in a milder, less violent reaction, when compared with reactions involving traditional powders. It is believed that this may be because expanding gases in the powders used in prior systems may cause portions of the powder to be shot forth as sparks or other high-temperature projectiles. The solid nature of the weld material agglomeration 102 may prevent ejectment of such material. Baffles or other devices may be used with traditional powders to control or prevent ejectment of hot material. Such baffles may be unnecessary when using the device 100.

As noted above, it is also unnecessary to utilize a metal disk, such as the metal disk 34 (FIG. 1), when utilizing the device 100. By dispensing with the need for inserting a metal disk, the welding process is simplified, and the chance of a bad result, caused by an inadvertent failure to insert a metal disk in a powder process, is avoided.

Use of the device 100 may result in a reduction in the amount of packaging material needed, in comparison to use of powdered weld metal materials. In addition, the agglomerated weld metal material may be less flammable, and may be subject to fewer restrictions in transportation.

Further advantages of use of the agglomerated weld metal material 102 includes that ignition may be more reliable than with use of powdered materials. Further, the use of agglomerated material may involve looser tolerances in the types or varieties of powder particle sizes that may be utilized. Agglomerated materials may be able to be made from particle sizes that would be considered unsuitable for use in loose powdered materials. Another advantage in the use of agglomerated weld metal material is that, unlike in powdered material, agglomerated weld metal material will not separate during shipping.

Figures 7, 8, 9:
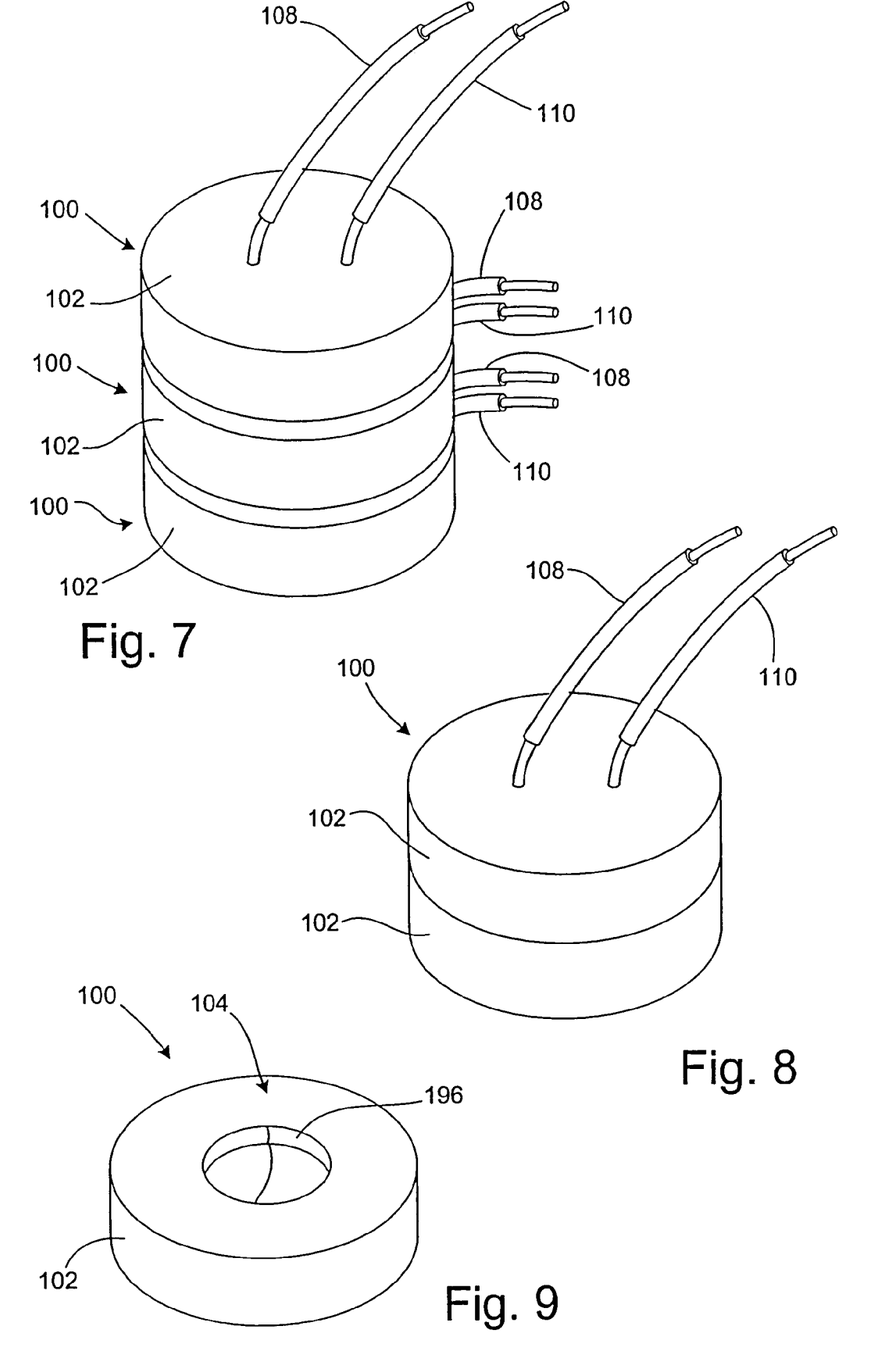
FIG. 7 is an oblique view showing the weld metal device of FIG. 3 stacked with other agglomerations of weld metal material.
FIG. 8 is an oblique view showing another configuration of stacked agglomerations in accordance with the present invention.
FIG. 9 is an oblique view showing an alternate embodiment weld metal device in accordance with the present invention, utilizing an ignitable starting powder as an igniter.

Turning now to FIG. 7, multiple devices 100 may be stacked together when more weld metal material is needed, for example, for joining together of larger conductors or bars. The multiple devices 100 may all have respective igniters, with only one of the igniters being used to initiate a reaction in the stack of the devices 100. Once the chemical reaction is initiated in one of the agglomerations 102, the exothermic reaction is sufficient to ignite the weld metal material in the agglomerations 102 of the other devices 100.

Alternatively, the stack of devices may include agglomerations 102 which do not have integral electrical igniters. Such a stack is illustrated in FIG. 8.

As shown in FIG. 9, the agglomerated weld metal material 102 may be used separately, with an exothermic reactive starting powder 196 being used to initiate the reaction. The starting powder 196 may be similar in composition and in use to the traditional starting powder 40 (FIG. 1). The starting powder 196 is an example of a non-electrical embodiment of a generalized igniter 104 for igniting the weld metal material agglomeration 102.

Figures 10A, 10B, 11, 12, 13:
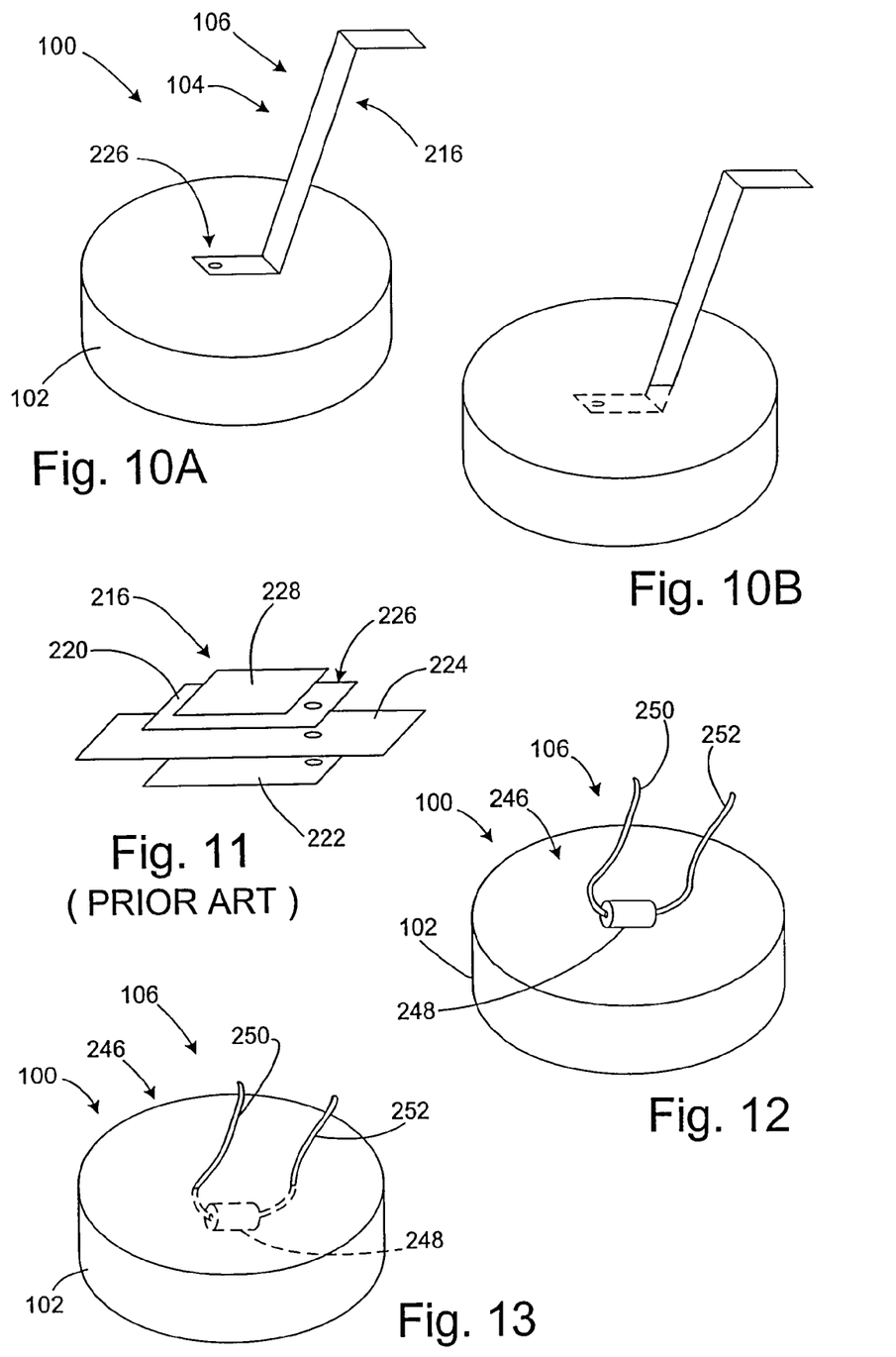
FIG. 10A is an oblique view of another weld metal device in accordance with the present invention, which uses a strip igniter.
FIG. 10B is an oblique view of another weld metal device in accordance with the present invention, which uses an embedded strip igniter.
FIG. 11 is an exploded view of a prior art strip igniter device that is part of the weld metal device of FIGS. 10A and 10B.
FIG. 12 is an oblique view of still another alternate embodiment weld metal device in accordance with the present invention, which uses a resistor.
FIG. 13 is an oblique view of a further alternate embodiment weld metal device in accordance with the present invention, which uses an imbedded resistor.

FIGS. 10A, 10B, and 11 illustrate an alternate embodiment of the weld metal device 100, wherein the igniter 104 is a variety of electrical igniter 106 that utilizes a strip igniter 216. The igniter 216 includes a pair of conductive metal foil strips 220 and 222, separated by an intermediate layer of insulation 224. A conical hole 226 is provided at one end of the layers 220-224. An additional insulation cover layer 228 may also be part of the igniter 216. The igniter 216 may be placed on the agglomeration 102 (FIG. 10A), or may be placed partially within the agglomeration 102 (FIG. 10B). Upon application of a sufficient voltage difference across the conductive metal foil strips 220 and 222, a spark plasma is believed to be formed at the conical hole 226, which may be employed to ignite the weld metal material in the agglomeration 102. The details regarding configuration and operation of a metal foil igniter such as the igniter 216 may be found in U.S. Pat. Nos. 6,553,911 and 6,703,578, the detailed description and figures of which are herein incorporated by reference. When employed as part of the device 100 shown in FIGS. 10A and 10B, the igniter 216 may be oriented such that the wide end of the conical hole 226 is open pointed toward all or most of the material of the agglomeration 102.

FIGS. 12 and 13 show two configurations of another variety of electrical igniter 106, a resistor-based igniter 246 that includes a resistor 248 and a pair of wires 250 and 252. The resistor 248 may be a typical off-the-shelf resistor. The wires 250 and 252 may be used to couple the resistor 248 to a suitable voltage source. When a substantial enough voltage is applied across the resistor 248, the resistor 248 ruptures, and a spark is generated. This spark may be utilized for igniting the weld metal material agglomeration 102. The resistor 248 may be placed either on the weld metal agglomeration 102 (FIG. 12), or inside the agglomerated weld metal material 102 (FIG. 13).

From the foregoing, it will be appreciated that many advantages may be realized from the use of agglomerated weld metal material devices for joining together conductive materials. Such agglomerations may have any of a wide variety of sizes, for example, ranging in size from 15 grams or less, to 500 grams. As noted above, the solids may be used in combination with one another to produce other amounts of weld metal material, as may be desired.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of coupling together two or more objects, the method comprising:
    inserting respective parts of the objects in a weld chamber of a mold;
    placing an agglomeration of weld-metal-producing material in a crucible of the mold, wherein the agglomeration is a unitary solid pressed-together mass of mixed particles of the weld-metal-producing material;
    igniting the agglomeration;
    producing molten weld metal material in the crucible by a chemical reaction of the agglomeration that produces the molten weld metal material from components of the agglomeration; and
    flowing the molten weld metal material produced by the reaction of the agglomeration into the weld chamber to thereby couple together the objects.

2. The method of claim 1, wherein the placing includes placing an agglomeration that is between 15 grams and 500 grams.

3. The method of claim 1, wherein the placing includes placing such that there is no material intervening between the agglomeration and a tap hole between the crucible and the weld chamber.

4. The method of claim 1, wherein the placing includes placing the agglomeration in contact with one or more walls of the crucible.

5. The method of claim 1, wherein the placing the agglomeration includes placing an agglomeration that includes:
    a metallic compound; and
    a reducing agent.

6. The method of claim 5, wherein the agglomeration further includes a mechanical binder.

7. The method of claim 5, wherein the molten weld metal material produced by the reaction of metallic compound and the reducing agent of the agglomeration constitutes substantially all of material coupling together the objects.

8. The method of claim 1, wherein the igniting includes electrically igniting the agglomeration using an electrical igniter that is mechanically coupled to the agglomeration.

9. The method of claim 1, wherein the placing the agglomeration includes placing plural agglomerations of weld-metal-producing material in the crucible.

10. The method of claim 1, wherein the igniting includes igniting the agglomeration with an electric igniter.

11. The method of claim 1, wherein the igniting includes igniting the agglomeration by igniting a chemically-reactive starting powder.

12. The method of claim 1, wherein the objects are conductors.

13. A method of coupling together two or more objects, the method comprising:
    inserting respective parts of the objects in a weld chamber of a mold;
    chemically reacting a metallic compound and a reducing agent of a solid agglomeration, wherein the agglomeration is a unitary solid pressed-together mass of mixed particles of the weld-metal-producing material, to thereby producing molten weld metal material from the metallic compound and the reducing agent of the solid agglomeration;
    directing the molten weld metal material produced by the reaction of the agglomeration into the weld chamber; and
    solidifying the weld metal material to thereby couple together the objects with the weld metal material produced from the reaction of the metallic compound and the reducing agent of the solid agglomeration.

14. The method of claim 13, wherein the agglomeration is between 15 grams and 500 grams before the chemically reacting.

15. The method of claim 13, wherein, prior to the chemically reacting, there is no material intervening between the agglomeration and a tap hole that the weld metal material flows through during the directing, to reach the weld chamber of the mold.

16. The method of claim 13, wherein, prior to the chemically reacting, the agglomeration is in contact with one or more walls of the crucible.

17. The method of claim 13, wherein the objects are conductors.

18. A method of coupling together two or more objects, the method comprising:
    chemically reacting a metallic compound and a reducing agent of a solid agglomeration, wherein the agglomeration is a unitary solid pressed-together mass of mixed particles of the weld-metal-producing material, thereby producing molten weld metal material from the metallic compound and the reducing agent of the solid agglomeration;
    flowing the molten weld metal material around parts of the objects; and
    solidifying the molten weld metal material around the parts to produce solidified weld metal material coupling the objects together.

19. The method of claim 18, wherein the agglomeration is between 15 grams and 500 grams before the chemically reacting.

20. The method of claim 18, wherein the objects are conductors.

* * * * *